United States Patent
Kayanakis et al.

(10) Patent No.: US 6,406,935 B2
(45) Date of Patent: Jun. 18, 2002

(54) MANUFACTURING PROCESS OF A HYBRID CONTACT-CONTACTLESS SMART CARD WITH AN ANTENNA SUPPORT MADE OF FIBROUS MATERIAL

(75) Inventors: Georges Kayanakis, Antibes; Christophe Mathieu, Saint Marcel; Sébastien Delenne, Trets, all of (FR)

(73) Assignee: ASK S.A., Valbonne (FR)

( * ) Notice: Subject to any disclaimer, the term of this patent is extended or adjusted under 35 U.S.C. 154(b) by 0 days.

(21) Appl. No.: 09/725,079

(22) Filed: Nov. 29, 2000

(30) Foreign Application Priority Data

Nov. 29, 1999 (FR) .............................................. 9915018

(51) Int. Cl.⁷ .............................................. H01L 21/44
(52) U.S. Cl. ...................................... 438/106; 257/679
(58) Field of Search .................................. 438/106, 118; 257/679

(56) References Cited

U.S. PATENT DOCUMENTS

| | | | |
|---|---|---|---|
| 4,725,924 A | 2/1988 | Juan | 361/398 |
| 5,495,250 A | 2/1996 | Ghaem et al. | 342/51 |
| 5,888,624 A | 3/1999 | Haghiri et al. | 428/195 |
| 5,969,951 A | 10/1999 | Fischer et al. | 361/737 |
| 6,161,761 A * | 12/2000 | Ghaem et al. | 235/492 |
| 6,173,898 B1 * | 1/2001 | Mande | 235/488 |

FOREIGN PATENT DOCUMENTS

| | | |
|---|---|---|
| DE | 44 03 513 | 8/1995 |
| DE | 196 01358 | 7/1996 |
| DE | 196 32115 | 12/1997 |
| EP | 198 376 | 10/1986 |
| EP | 615 285 | 9/1994 |
| FR | 615 285 | 1/1927 |
| FR | 2 769 440 | 4/1999 |
| WO | WO 94/11846 | 5/1994 |

\* cited by examiner

*Primary Examiner*—David Nelms
*Assistant Examiner*—Quoc Hoang
(74) *Attorney, Agent, or Firm*—James C. Lydon

(57) ABSTRACT

The present invention relates to a hybrid-contact contactless smart card manufacturing process and specifically a manufacturing process for hybrid-contact contactless smart card in which the antenna is on a fibrous material such as paper. This process includes a manufacturing step to screen print the antenna onto the support, a step to laminate the card body onto the antenna support by hot press molding, a step to mill a cavity in the card body opposite the side of the support bearing the screen print for housing a module comprised of a chip and a double-sided circuit and a step for inserting the module in the card. Cutouts made in the corners of the antenna support prior to the lamination step enable the card bodies to be bonded together. The card thus obtained allows a posteriori viewing of any mechanical misuse to which it may have been subjected (extreme bending).

11 Claims, 2 Drawing Sheets

MANUFACTURING PROCESS OF A HYBRID CONTACT-CONTACTLESS SMART CARD WITH AN ANTENNA SUPPORT MADE OF FIBROUS MATERIAL

TECHNICAL FIELD

The present invention relates to smart card manufacturing processes, and specifically a hybrid contact-contactless manufacturing process of a smart card, the antenna of which is on a support made of fibrous material such as paper.

PRIOR ART

The contactless smart card is a system being used increasingly in various sectors. In the transport sector, the card has been developed as a means of payment. The same holds true for the electronic wallet. Many companies have also developed identification means for their personnel using contactless smart cards.

The exchange of information between a hybrid contact-contactless card and the associated reader takes place via remote electromagnetic coupling between an antenna embedded in the contactless card and a second antenna located in the reader or directly by contact with the reader. In order to create, store and process the information, the card is equipped with an electronic module which is connected to the antenna. The antenna is generally located on a dielectric support made of plastic material. The standard industrial manufacturing process can be broken down into three steps:

- the antenna is made on a plastic dielectric support (polyvinyl chloride (PVC), polyesters (PET), polycarbonate (PC) . . . ) (polyvinyl chloride (PVC), polyesters (PET), polycarbonate (PC) . . . ) using copper or aluminum etching techniques,
- hot-lamination under pressure of the upper and lower plastic layers of the card body (PVC, PET, PC, acrylonitrile-butadiene-styrene (ABS) . . . ), onto the antenna support in order to create a monobloc card.
- placement and connection of an electric module using electrically conductive glue.

However, this process generates several major drawbacks. The process leads to a composite stack of glued or heat bonded plastic materials with different thermal expansion coefficients. As a result, systematic unacceptable and irreversible distortion of the cards is observed (twisting, warping), as well as a lack of mechanical resistance when subjected to standardized or equivalent tests.

Furthermore, PVC exhibits poor thermomechanical properties. During the lamination process, material flow is significant and the antenna's shape factor is not maintained. This leads to antenna malfunction as the electrical parameters (inductance and resistance) vary. It is not uncommon to experience antenna breakage in areas subjected to strong sheer stresses. This is particularly the case in angles and at electrical bridging points.

The laminated ISO cards have a total thickness between 780 and 840 m. Considering the material flows described above, it is also very difficult to guarantee customers a narrow and controlled distribution of the cards' population. operation creates a monobloc card with poor mechanical properties in terms of the restitution of absorbed stresses: during standardized bending and twisting tests, all of the stress applied is transmitted to the electronic module and primarily to the bonding points which make the connections. The mechanical strength of the bonding joints is subjected to great strain and the slightest imperfection in the bond causes the module—antenna connection to break.

After lamination, the imprint from the copper etching is visible on the printed card bodies. Although this does not prevent the card from operating correctly, the defect is often emphasized by users who are very concerned about the aesthetic criteria.

Furthermore, the cost of manufacturing the card with this process is too high to enable any real increase in its usage.

Lastly, the processes currently used does not produce cards with the possibility to view the poor mechanical treatment inflicted on them by the users, particularly with the intent to commit fraud. It is in fact relatively easy for someone with experience in card fraud to destroy the card by folding it repeatedly without it being possible to easily prove any malicious intent afterwards. For example, the antenna may be cut without the card being marked. Commercial policies set up within companies generally ensure the replacement of defective cards free of charge. The systematic replacement of these cards is a source of major supplementary costs for these companies.

SUMMARY OF THE INVENTION

The purpose of the invention is to mitigate these drawbacks by supplying an inventive manufacturing process using a support made of fibrous material on which an antenna is screen printed using electrically conductive ink, thereby significantly reducing the production costs of hybrid or contactless smart cards.

The invention thus relates to a manufacturing process of a hybrid contact-contactless smart card with an antenna support made of fibrous material such as paper, including the following steps:

- A manufacturing process of the antenna consisting in screen printing turns of electrically conductive polymer ink on a support made of fibrous material and to subject said support to a heat treatment process in order to bake the ink,
- A step for laminating the card bodies onto the antenna support consisting in welding, on each side of the support, at least two sheets of plastic material, forming the card bodies, by a hot press molding technique,
- A cavity milling step consisting in piercing, in one of the card bodies, a cavity for housing the module comprised by the chip and the double-sided circuit, the cavity including a smaller internal portion which receives the chip and a larger external portion for receiving the double-sided circuit, the cavity being dug into the card body which is opposite the side of the support featuring the electrically conductive screen printed ink forming the antenna, and the milling operation enabling the connection pads to be removed, and
- a module insertion step consisting in using a glue enabling the module to be secured and a glue containing silver for connecting the module to the connectors, and to position it in the cavity provided for this purpose.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE PREFERRED EMBODIMENTS

Figure 1A:
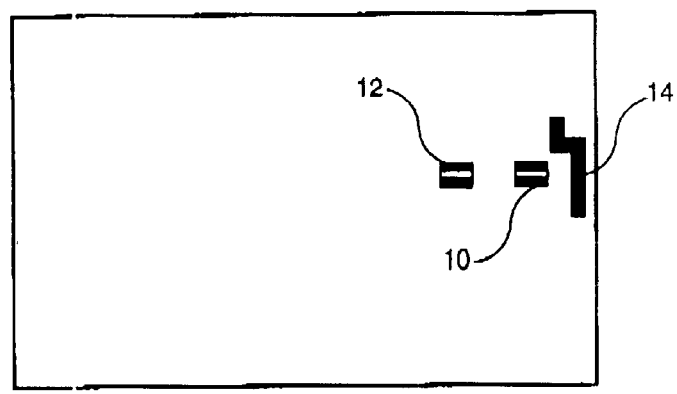
FIGS. 1A to 1C represent the various steps used in screen printing the antenna on the support.
Figure 1B:
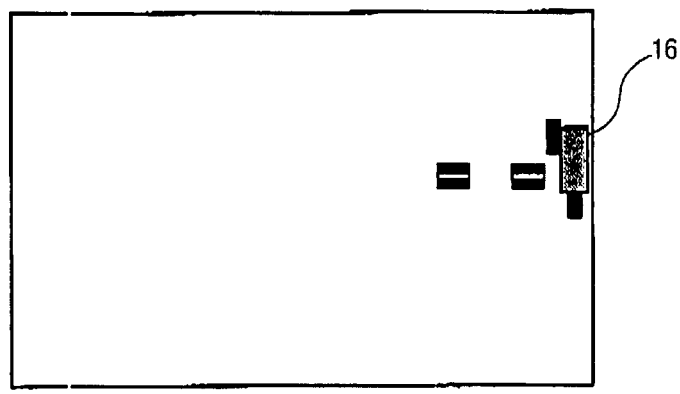
Figure 1C:
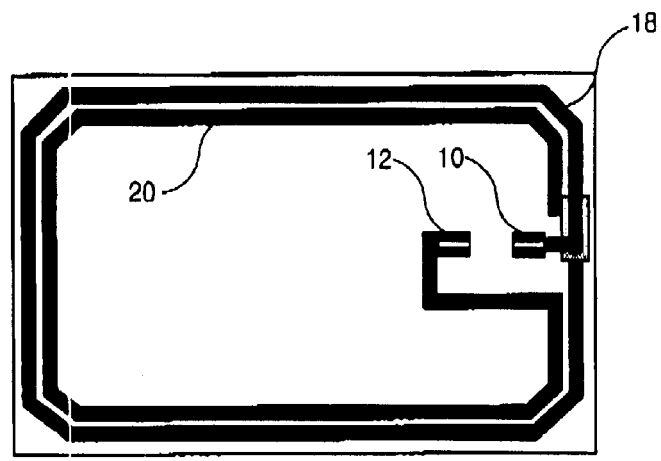

The smart card manufacturing process according to the invention initially consists of placing the antenna on a support. This support is made of a sheet of fibrous material such as paper. According to a preferred embodiment, the antenna is screen printed on this material in several steps and in reverse order compared with the standard screen printing process. The first step, represented in FIG. 1A, consists in screen printing the two bonding pads 10 and 12 of the antenna to the module and the electric bridge 14, commonly referred to as the "cross-over", allowing the two turns to be connected in series. The second screen printing step, represented in FIG. 1B, consists in screen printing an insulating strip on top of the cross-over. The third and last screen printing step consists in screen printing the two turns 18 and 20. One end of the turn 18 is connected to the bonding pad 10 and the other end to the cross-over 14. Turn 20 is screen printed from the cross-over 14 to bonding pad 12.

Figure 2:
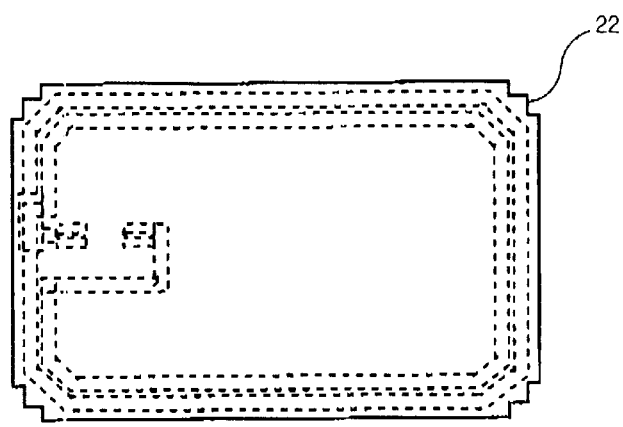
FIG. 2 represents the support with the antenna screen printed on the back, prior to the lamination step.

Once the antenna has been screen printed on the support, it is cut to the dimensions of the card. According to a preferred embodiment, a cutout 22 is made in each corner of the support, as shown in FIG. 2. This cutout enables a direct weld between the card bodies during the lamination process.

Lamination is carried out by hot press moldings. According to a preferred embodiment, two layers of plastic material are used for each card body. This plastic material is generally polyvinyl chloride (PVC), polyester (PET, PETG), polycarbonate (PC) or acrylonitrile-butadiene-styrene (ABS). According to a preferred embodiment, PVC is used. The two layers have different stiffness. The external layer is made of rigid PVC, while the inside layer (in contact with the antenna support) is made of soft PVC with a lower Vicat softening temperature (the temperature at which the PVC shifts from a rigid state to a rubbery state). The two layers may also be of different thickness. For example, each of the card bodies consists of an external rigid PVC layer of approximately 310 microns ($\mu$m) thick and an internal soft PVC layer of approximately 80 $\mu$m thick. The antenna support is made of paper approximately 125 $\mu$m thick. According to another manufacturing example, which is a preferred embodiment, each one of the card bodies is comprised of three layers. A cover, consisting of a transparent PVC sheet or varnish layer, is added on the external layer of the card body when it is printed in order to protect the printing. This cover is approximately 40 $\mu$m thick. The external layer of the card body is thus 275 $\mu$m thick and the internal layer approximately 40 $\mu$m thick.

The lamination step consists of stacking together the various layers of PVC which form the card body and the antenna support. This sandwich is then placed in a lamination press. The sandwich is heat treated at a temperature greater than 100° C., and preferably greater than 150° C. At the same time, the sandwich is pressed in order to fuse the various layers together. Under the combined action of heat and pressure, the external PVC softens and the internal layer made of PVC with a lower Vicat softening temperature then liquefies. The liquefied PVC traps the screen printed ink of the antenna within the mass of the card offering it enhanced resistance to the mechanical stresses encountered during smart card usage. Furthermore, the antenna adheres to the card body better This adherence may be enhanced by using pressure-sensitive double-face tape placed between the card body and the antenna.

The cutouts 22 made in the corners of the antenna support allow the two internal PVC layers to come into contact with one another. By blocking the corners by welding the two card bodies together, all of the mechanical stresses are directed inside the card. In the case of the paper, paper pulp exhibits low internal cohesion. When it is subjected to sheer forces, the core of the paper tends to delaminate. If these stresses are too strong, the card opens up and splits in two parts (the part which contains the antenna connected to the module continues to function). In this manner, by acting on the type of paper and on its internal cohesion, we can benefit from this physical property in order to create a card with a built-in and variable stress marker. According to the customer's needs, delamination may thus be more or less rapid and more or less significant so that limited flexion of the card may be seen owing to the delamination of the paper inside the card.

The next step consists in milling a cavity which will receive the module comprised of the chip and the double-sided circuit. The milling operation also enables bonding pads between the antenna and the module to be removed. In order not to damage the screen printed imprint of the antenna, the milling operation is carried out in the card body which is opposite the antenna support face with the screen printed imprint, that is to say in the card body which is in contact with the side of the support not bearing the screen printed antenna. In this manner, during the milling operation, the antenna support is milled before the ink. Furthermore, as it is embedded in the PVC of the first layer of the card body, it is not subjected to damage such as cracking or tearing. In the case of an ISO format smart card for which the location of the chip on the card is standardized, the inverted screen printed imprint of the antenna on the support and the milling of the cavity in the card body which is in contact with the side of the support not bearing the screen print, enables the module to be installed in the standardized location while maintaining the integrity of the screen printed antenna.

Figure 3:
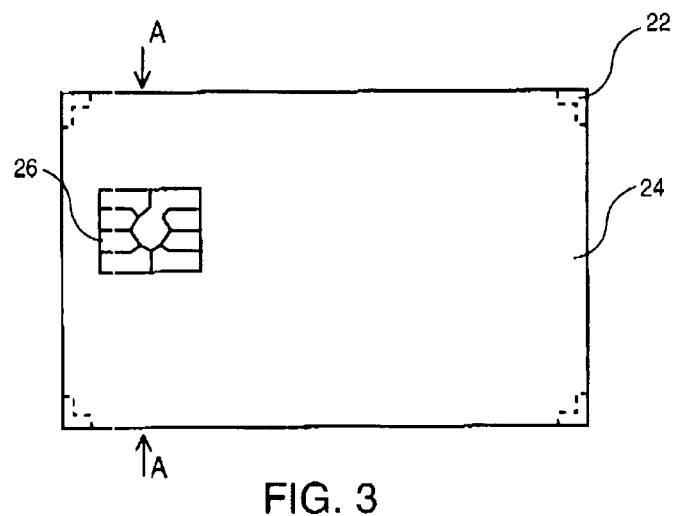
FIG. 3 represents the smart card at the end of the manufacturing process.

The module is glued in place. Two different adhesives are used. The first glue is an electrically conductive adhesive which enables the module to be connected to the antenna contacts. This adhesive is preferably an adhesive which contains silver. The second glue is used to secure the module to the card. According to a special embodiment, cyanoacrylate glue is used. It is also possible to use a film-type "hot-melt" adhesive which is placed under the module prior to its insertion in the card. Once this step is terminated, a card as shown in FIG. 3 is obtained. The bodies of the card 24 are heat bonded together in the corners via the cutouts 22 on the antenna support. The module 26 is located in the standardized location for ISO type smart cards.

Figure 4:
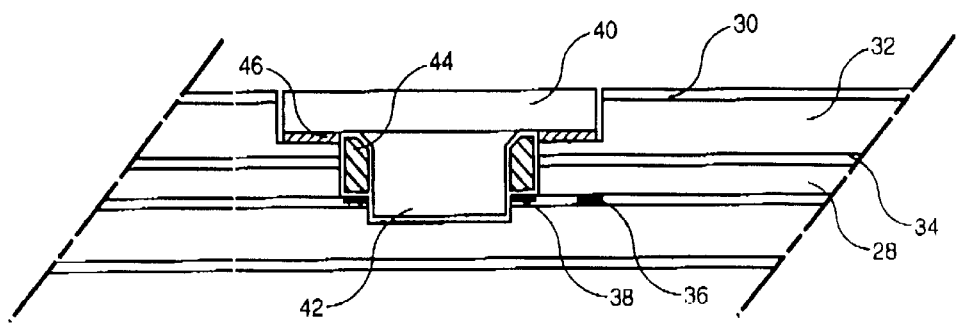
FIG. 4 represents a cross section of the smart card, represented in FIG. 3, along the axis A—A of FIG. 3.

FIG. 4 is a cross sectional view along axis A—A of the smart card represented in FIG. 3. The card consists of an antenna support 28 made of fibrous material, inserted between the two card bodies. Each card body contains a cover 30 which consists of a sheet of transparent PVC film or varnish layer, an external rigid PVC layer 32 and an internal soft PVC layer 34. The turn 36 and the bonding pads are trapped in the internal layer 34 of the card body's PVC mass. The cavity milled in the card body opposite the support face bearing the antenna receives the double-sided circuit 40 and the chip 42, protected by an overmolding resin (not represented). The module is connected to the contacts of antenna contacts 38 with a layer of silver-load electrically conductive glue 44. A layer of cyanoacrylate glue 46 secures the module to the card.

The process according to the invention offers a card having two major qualities for the companies which use it:

the preservation of the electrical components provide this card with enhanced solidity and, in case of card malfunction, the delamination property of the fibrous materials such as the paper allows to make sure that the card has not been subjected to intensive folding for the purpose of frauding.

What is claimed is:

1. A manufacturing process of a hybrid contact-contactless smart card with an antenna support made of fibrous material such as the paper, including the following steps:

a manufacturing process of the antenna consisting in screen printing turns of electrically conductive polymer ink on a support made of fibrous materials and to subject said support to a heat treatment in order to bake said ink, a step for laminating the card body onto the antenna support consisting in welding on each side of said support at least two sheets of plastic material, forming the card bodies, by hot press molding, a cavity milling step consisting in piercing, in one of the card bodies, a cavity for housing the module comprised of the chip and the double-sided circuit, said cavity including a smaller internal portion which receives the chip and a larger external portion for receiving the double-sided circuit, said cavity including a smaller internal portion which receives the chip and a larger external portion for receiving the double-sided circuit, said cavity being dug into the card body which is opposite the side of the support featuring the electrically conductive screen printed ink which forms the antenna, and the milling operation enabling the connection pads to be removed from the chip, and a module insertion step consisting in using a glue enabling said module to be secured and a glue containing silver for connecting said module to said connectors, and to position said module in the cavity provided to this end.

2. The smart card manufacturing process according to claim 1, in which the two sheets each forming card bodies on each side of said antenna support made of fibrous material have different stiffness.

3. A smart card manufacturing process according to claim 1, in which, during the antenna manufacturing process, the corners of the paper antenna support are notched in order to allow the two card bodies to be welded together; said card obtained thereby offering a preferential delamination zone which will highlight any act of deliberate damage a posteriori.

4. A smart card manufacturing process according to claim 1, in which the antenna manufacturing step is conducted in reverse order and consists in:

Screen printing with a polymer ink, on the support, two antenna contacts for the module and a cross-over, Screen printing with dielectric ink, on the support, an insulating strip on top of the cross-over, Screen printing with polymer ink, on the support, at least two turns for the antenna, these turns having there ends in contact with a different connecting pad and the other end in contact with the cross-over, enabling an antenna with two turns in series to be obtained.

5. A smart card manufacturing process according to claim 2, in which the sheet forming the outer layer of the card body is more rigid than the sheet forming the internal layer of the card bodies, said internal layer having a low Vicat softening temperature.

6. A smart card manufacturing process according to one claim 1, in which the two sheets forming the card bodies on each side of said antenna support made of fibrous material are of different thickness.

7. The smart card manufacturing process according to claim 6, in which the sheet forming the external layer is thicker than the sheet forming the internal layer.

8. A process for manufacturing a smart card according to claim 1, in which, during the hot lamination step of the card bodies onto the antenna support, a third sheet of plastic material or varnish layer is added to each card body which acts as a cover.

9. A smart card manufacturing process according to claim 1 the plastic materials forming the card bodies is polyvinyl chloride (PVC), polyester (PET, PETG), polycarbonate (PC) or acrylonitrile-butadiene-styrene (ABS).

10. A smart card manufacturing process according to claim 1 in which the glue used to secure the module is a fluid cyanoacrylate adhesive, which is placed in the cavities prior to the insertion of said module.

11. A smart card manufacturing process according to claim 1, in which the glue used to secure the module is a film-type "hot melt" adhesive which is placed under the module prior to its insertion in the card.

* * * * *